United States Patent [19]

Murphy et al.

[11] Patent Number: 4,554,446

[45] Date of Patent: Nov. 19, 1985

[54] SUPERMARKET INVENTORY CONTROL SYSTEM AND METHOD

[76] Inventors: Arthur J. Murphy, 18337 Superior St., Northridge, Calif. 91325; Joseph F. Stratton, 33 Broad Rd., Greenwich, Conn. 06830

[21] Appl. No.: 552,916

[22] Filed: Nov. 18, 1983

[51] Int. Cl.⁴ ............................................. G06K 19/00
[52] U.S. Cl. .................................... 235/487; 235/385; 235/493
[58] Field of Search ........................ 235/487, 493, 385

[56] References Cited

U.S. PATENT DOCUMENTS 3,108,824 10/1963 Fischer ............................ 235/493 X
3,959,624 5/1976 Kaslow ............................... 235/487

Primary Examiner—Harold I. Pitts
Attorney, Agent, or Firm—Singer & Singer

[57] ABSTRACT

A system and method for use in a supermarket utilizing code reading machine scanning equipment to verify compliance of coded redemption coupons and sale vouchers submitted by the public. All documents contain machine readable coded information defining the terms and conditions of redemption and a scanning verification system is provided that indicates directly to the checkout clerk and customer whether all coded conditions on the redemption coupon have been satisfied prior to approving the discount offered by the coupon.

15 Claims, 5 Drawing Figures

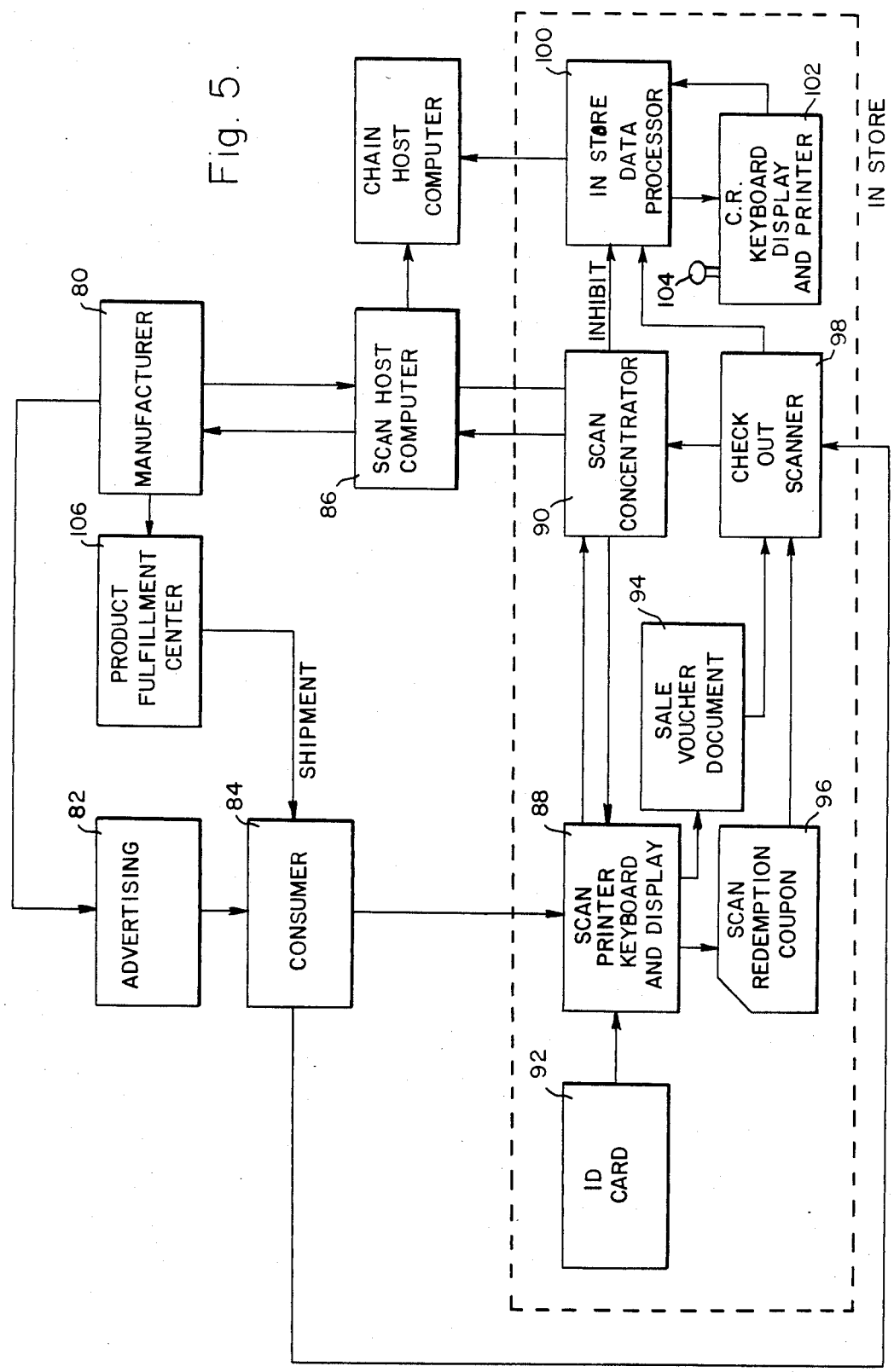

SUPERMARKET INVENTORY CONTROL SYSTEM AND METHOD

This invention relates to a system for use in a supermarket having code reading machine scanning equipment for processing coded sale vouchers having specific coded redemption requirements encoded on the voucher.

The system and method being described allows the supermarket to become a point of sale for premiums and products and other items and services that are not stocked at the store. In addition, the system is capable of processing coded sale vouchers in the form of coded redemption coupons that the customer returns to the store for credit when satisfying the conditions stated on the coupon.

The invention will be described primarily in terms of handling and processing coded redemption coupons with later references being made to utilizing the same system for generating coupons and sales voucher documents in the supermarket and utilizing the supermarket as a point of sale for premiums and products not stocked by the store.

The merchandising of food and ancillary items through a supermarket is big business and is the subject matter of much research, advertising and promoting. One form of advertising utilized by many manufacturers in the advertising of their product is to offer coupons which give the consumer a discount on the price paid for a given product provided the consumer satisfies the conditions of the coupon as stated.

Typically a given coupon would offer 50 cents off the purchase price of a given product provided the consumer utilizes the coupon before the expiration date which is printed on the face of the coupon and also provided that the consumer purchases the product of the proper size, weight and volume as stated on the redemption coupon.

The redemption coupons are usually advertised in a local paper by way of full page ads or inserts or even as throwaways to entice the consumer to save the coupon and purchase the item at their local supermarket.

In theory the consumer goes to the supermarket, makes the necessary purchases and hopefully selects those items which will give her a discount when she presents the coupon at the point of sale terminal.

The supermarket clerk manning a point of sale terminal checks the items, runs up the total and then reviews the coupon to determine compliance and, if correct, applies the necessary discounts to the total bill which is paid by the consumer.

Usually at the end of the day the store personnel accumulate all coupons received at each point of sale terminal, bundles them up, and sends them to an impartial counter for counting and processing. There are many companies that specialize in this business of which A. C. Nielsen is very active.

These coupons must of necessity be hand-sorted, counted and tallied, with the resulting tally sent to each manufacturer for review and processing. The manufacturer must of course pay the supermarket for the discount allowed by the coupon and also the manufacturer pays a handling fee on the order of 7 cents per coupon directly to the store as a processing fee for handling the coupon for the manufacturer. Usually the manufacturer again verifies the count which again is a hand manual process and then finally submits a check to the supermarket covering the handling fee and the amounts given by way of discounts as stated on the redemption coupons.

There are of course many problems in the system of redeeming coupons and these problems are very complex, expensive and annoying to all parties involved which include the manufacturer, the supermarket and the consumer.

From the consumer's point of view there is an opportunity for a bargain by purchasing the item for which she has a coupon. Unfortunately the consumer must remember to have the coupon with her at the time of making the purchase.

In the usual supermarket operation, the customer brings her bag of groceries to a point of sale terminal where the individual items are unloaded and the clerk identifies each item and rings up the sale either manually or by code reading machine equipment, if available. After all items have been tallied, the customer usually presents her coupons to the clerk who must then read each coupon separately to determine if the coupon is being offered before the termination date and, further, whether all terms and conditions of the coupon have been complied with. This of course means that the clerk must check the item to determine if the customer did in fact buy the item which by itself is not an easy task when the average purchase of goods is over $75 and, further, the clerk must determine if the proper size or volume container was purchased to satisfy the conditions on the coupon. This whole procedure is usually time-consuming and irritating not only to the consumer but also to those consumers waiting for their turn at the point of sale terminal.

The manufacturer, on the other hand, utilizes the offering of redemption coupons as a means of generating a sale incentive for his product and for this reason is ready to offer a discount provided the purchase is made within the given time period and of the proper size container. Unfortunately the manufacturer also knows that because the clerk at the point of sale terminal is usually hurried and probably harried when presented with a bunch of coupons after a $75–$100 sale that the clerk is not as diligent as one should be in checking to determine if the customer did in fact buy the product of the manufacturer and of the proper size of container as specified on the coupon. In many cases the clerk simply runs up the credit for all of the coupons without necessarily checking to determine if the item was purchased and the coupon terms satisfied. This of course means that the manufacturer is giving a discount when in many cases the customer didn't even buy his product and if the customer did buy his product a smaller size was possibly purchased, not satisfying the terms of the redemption coupon.

The supermarket store, on the other hand, is required to handle each and every coupon separately as it is processed by the consumer and to immediately give a discount on the total bill for the value of the coupon and then wait some period of time before the manufacturer pays the supermarket back for the cost of handling and for the monies discounted.

While it is true that the supermarket receives approximately 7 cents per coupon as a handling charge, it is well known that the cost of processing the coupon and having the coupons verified by outside sources is not only expensive but also very time-consuming, thereby delaying the time that the manufacturer can be billed for the monies already laid out by the supermarket in discounting the redemption coupons.

Last but not least there is the question of fraud that can be practiced by unscrupulous people in handling the redemption coupons. For example, there are cases where the supermarket has been known to purchase large quantities of redemption coupons at a substantial discount from persons who specialize in accumulating valid redemption coupons. The supermarket is then able to bill the manufacturer for the face amount of each coupon plus a handling charge and without having offered the service to the consumer or actually sold the product to anyone.

The consumer herself is capable of practicing a fraud on the manufacturer by presenting coupons for items not purchased and demanding the checkout counter operator at the point of sale to give credit on the total bill. This is usually done especially where the checkout operator is a young person and easily intimidated and eager to satisfy and move the customer on and out of the store. The end result of course is that the manufacturer pays the supermarket for the value of the coupon when in fact no goods were sold and no benefit to the manufacturer has occurred.

Last but not least the outside coupon verifiers have come under a certain amount of criticism since it is well known that all handling of coupons must be done manually and as inexpensively as possible. By necessity these companies usually send the coupons out of the country where cheap labor is available for the processing, tallying and accumulation of the coupon values. The supermarkets claim that the tallies given the manufacturer are usually on the low side whereas the manufacturers claim that the tallies usually favor the supermarket and are on the high side.

The redemption coupon loop is so loose as to allow many other aspects of fraud to be perpetrated on the participants. The American Society for Industrial Security, a Virginia-based association of company security officials, has estimated that fraudulently redeemed coupons range as high as $350 million each and every year.

The problem of course has been recognized by all responsible officials of the industry, however, until the advent of the present invention there has been no satisfactory system or method proposed that would or could verify the redemption coupon as being valid, verify the sale as being correct according to the terms of the redemption coupon, and provide the manufacturer with an automatic record indicating sales of items and without the necessity of all the manual handling that is required with the present systems.

The supermarkets have been instrumental in pioneering code reading machine scanning equipment capable of reading coded information located on sales merchandise. Systems of this order have been successful in speeding up the operation of the customer through the checkout line. In recent years supermarkets have become automated and have begun to use machine readable codes such as the Universal Product Code known as the UPC or bar code. The code consists of a series of bars printed on a package or on a label attached to the package, and the scanner which is located at the point of sale terminal reads the coded information which usually includes the total cost of the package, the type of commodity, name of manufacturer, and an identification of the commodity itself.

In the prior art there are many patents such as U.S. Pat. No. 3,961,747 which discloses a system that prints a bar code on a label and in which the code includes the commodity price. U.S. Pat. Nos. 3,291,232 and 3,459,272 show examples of prior art systems where the data is printed in human readable form only. U.S. Pat. No. 3,741,324 shows a computer scale having a keyboard data entry and decoding system and apparatus for handling human machine readable signals, whereas U.S. Pat. No. 3,459,271 shows a computer scale system connected to a central computer. In connection with the above, U.S. Pat. No. 4,365,148 is still another system for preparing labels containing the UPC code.

Manufacturers on the other hand have been experimenting with increasing the availability of coupons to the consumer by sponsoring coupon printers located at individual supermarkets and capable of being operated by the consumer. The idea being that the consumer would not have to carry coupons with her when going to the store but may simply go to the store and obtain all of her coupons there and before making a selection of the items to be purchased.

Unfortunately problems associated with providing verification acceptable to all parties and speeding the items through the checkout counter while at the same time ensuring that the goods specified in the redemption coupon are sold is still not available until the advent of this invention.

In the broad concept, a coded sales voucher in the form of a coded redemption coupon is produced having a machine readable code on the document itself and which code is capable of being read by machine scanning equipment located at point of sale terminals in each of the supermarkets.

The present bar code being utilized by the supermarkets is the UPC code and hence the redemption coupons to be used in the present method and system will have the UPC bar code printed directly on the coupon itself.

Located at each store and at each point of sale terminal is the conventional cash register, keyboard, display and printer and a checkout scanner which is used and operated in the conventional manner. Located in each store is an in-store data processor that controls the cash register, keyboard, display and printer and which communicates with each code reading machine scanning equipment for continuously identifying, accumulating and processing all coded redemption information received from each point of sale terminal.

Located in each store is a single scan coupon concentrator that communicates with each code reading machine scanning equipment in real time for continuously comparing coupon redemption information with sales item information at each sales terminal and for each sale transaction to determine compliance of all coded coupon redemption conditions.

The scan coupon concentrator processes and accumulates all coupon redemption information for every complete transaction at each point of sale terminal to determine compliance of all coded redemption conditions and transmits item identification and credit to be given to customer to said in-store data processor and in the absence of compliance generates an inhibit signal that is transmitted to the in-store data processor which informs the clerk and the customer that the document is not valid.

The scan coupon concentrator simply holds all sales information in a suitable transaction register and when the checkout scanner scans the individual coupon a comparison is immediately made between the coupon and the sales items in register to determine if all coded redemption terms are met. If they are, then the sale continues normally, the scan concentrator transmits item information and credit information to the in-store data processor and all coupon redemption information is accumulated in a scan coupon concentrator.

Usually at the end of the day the accumulated record in the scan coupon concentrator is transmitted to a centrally located scan host computer which receives information from all remotely located supermarkets. The accumulated information is then fed to a chain host computer for reconciliation with information provided to the chain host by the in-store data processors. All accumulated coupon redemption information is submitted to the manufacturer for processing and billing purposes.

The remotely located chain host computer also receives information on a periodic basis from each in-store data processor located in each supermarket to thereby complete all billing information for all stores in the supermarket chain.

The method and system described allows the scan coupon concentrator to independently verify all redemption coupons without special handling by outside personnel. In addition, the accumulation of all scan coupon redemption information occurs in a parellel form with the normal bookkeeping records of the supermarket as determined by each in-store data processor and hence all information is separate and identifiable and not subject to special handling by outside personnel.

Further objects and advantages of the present invention will be made more apparent by referring now to the accompanying drawings wherein:

FIG. 5 is a block diagram of a preferred embodiment illustrating concepts of the present invention for redeeming any coded sales voucher including coded redemption coupons.

The present invention is concerned with utilizing machine readable coded sales voucher and the term coded sales voucher is intended to also include a coded redemption coupon or a sales voucher document or any other transfer document containing a machine readable code for handling a transfer of funds at a point of sale in a supermarket having code reading machine scanning equipment.

The invention is described primarily in connection with coded redemption coupons in order to highlight the advantages of utilizing the present system and method over that system that is presently being used today.

Figure 1:
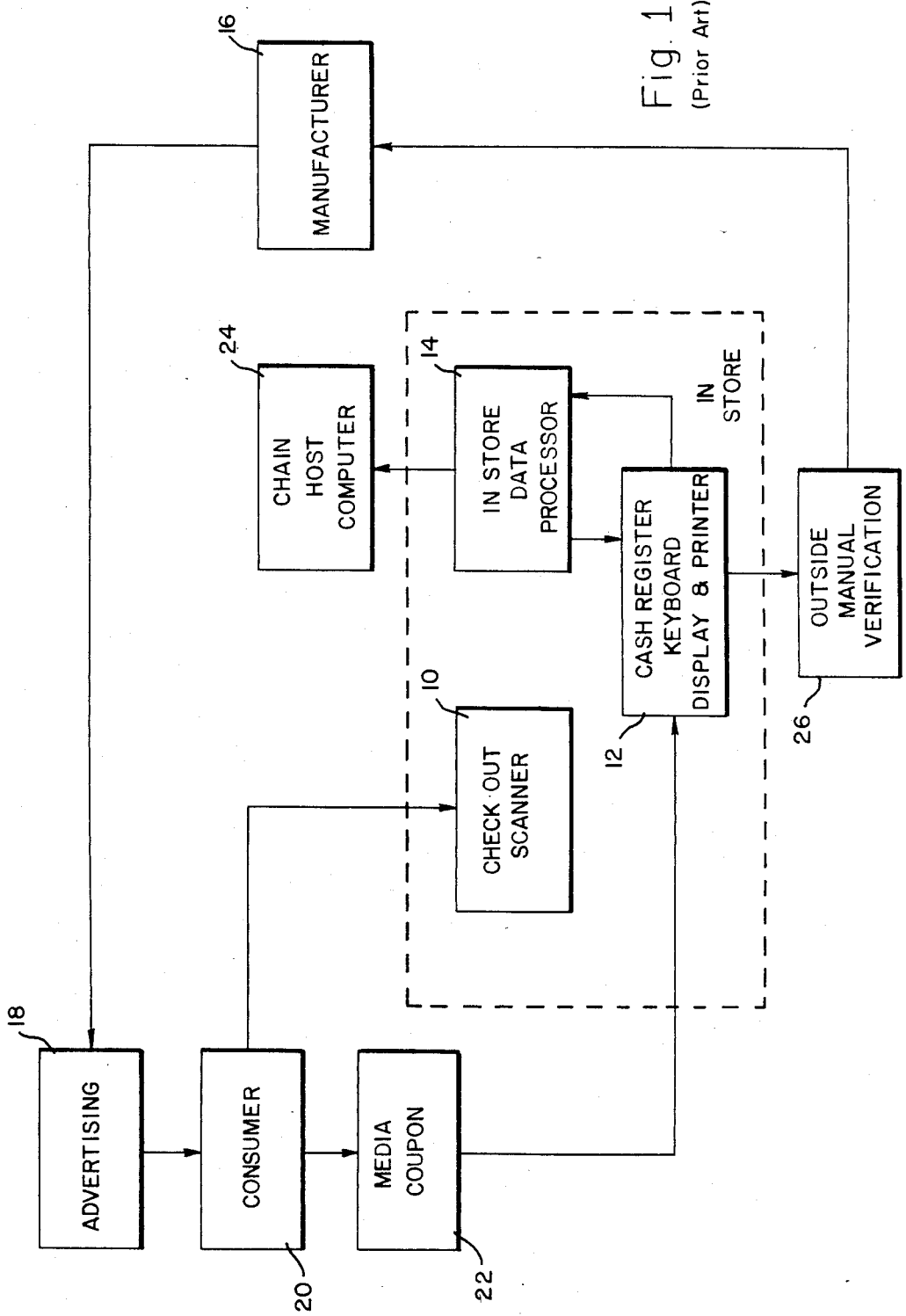
FIG. 1 is a block diagram illustrating prior art techniques for coupon redemption.

Referring now to FIG. 1, there is shown a block diagram of a typical supermarket store having a code reading machine scanner at each point of sale location.

Located at each point of sale terminal in the supermarket store is a checkout scanner 10 and a cash register, keyboard, display and printer 12. Typically each supermarket has a plurality of point of sale terminals, each having a checkout scanner and a cash register, keyboard, display and printer, all under the control of a single in-store data processor 14 that utilizes conventional multiplexing techniques handling the requirements of each checkout scanner and each cash register, keyboard and printer.

In the typical system a manufacturer 16 in cooperation with print media advertising 18 brings to the attention of a consumer 20 a redemption coupon termed a media coupon 22. The media coupon 22 is very similar to that illustrated in connection with FIG. 3 except that the media coupon probably does not contain machine readable codes.

The consumer 20 on approaching the point of sale places all of the purchased items before the checkout clerk who uses the checkout scanner 10 to machine read the bar codes on the tags associated with each of the purchased itmes. The output of the checkout scanner 10 feeds the in-store data processor which accumulates the data and which in turn controls the cash register, keyboard, display and printer 12 to display the cost of each item scanned.

The customer 20 then presents the media coupon 22 to the checkout clerk who manually enters the credit amount in the cash register, keyboard, display and printer 12. The checkout clerk must also verify that the consumer 20 has in fact purchased the item set forth in the redemption coupon and further that all conditions of the redemption coupon have been complied with. The clerk then enters the payment tendered by the consumer 20 on the cash register, keyboard, display and printer 12 and the complete transaction is accumulated and processed by the in-store data processor 14.

At the end of the day the in-store data processor 14 transmits over telephone lines all accumulated transaction information to a remotely located chain host computer 24 which now has a complete record of all transactions taking place at that particular store for the last time period.

The checking clerk on a periodic basis must then bundle and sort all redemption coupons received, which coupons must be counted and verified in order to establish an amount that the manufacturer must pay the store for both handling the coupon and for the discount offered. Typically the stores and manufacturers do not provide verification of the coupons but rather hire third parties commonly known as coupon clearing houses that provide outside manual verification as at 26 that count, sort and verify all coupons passing through the supermarket.

Based on the count of the outside manual verification 26 the manufacturer 16 is then billed for all costs incurred. Implicit in the present handling system of the outside manual verification is the heavy reliance on manual labor which is both time-consuming and expensive since all verification must be done manually and on a piece by piece basis.

Figure 2:
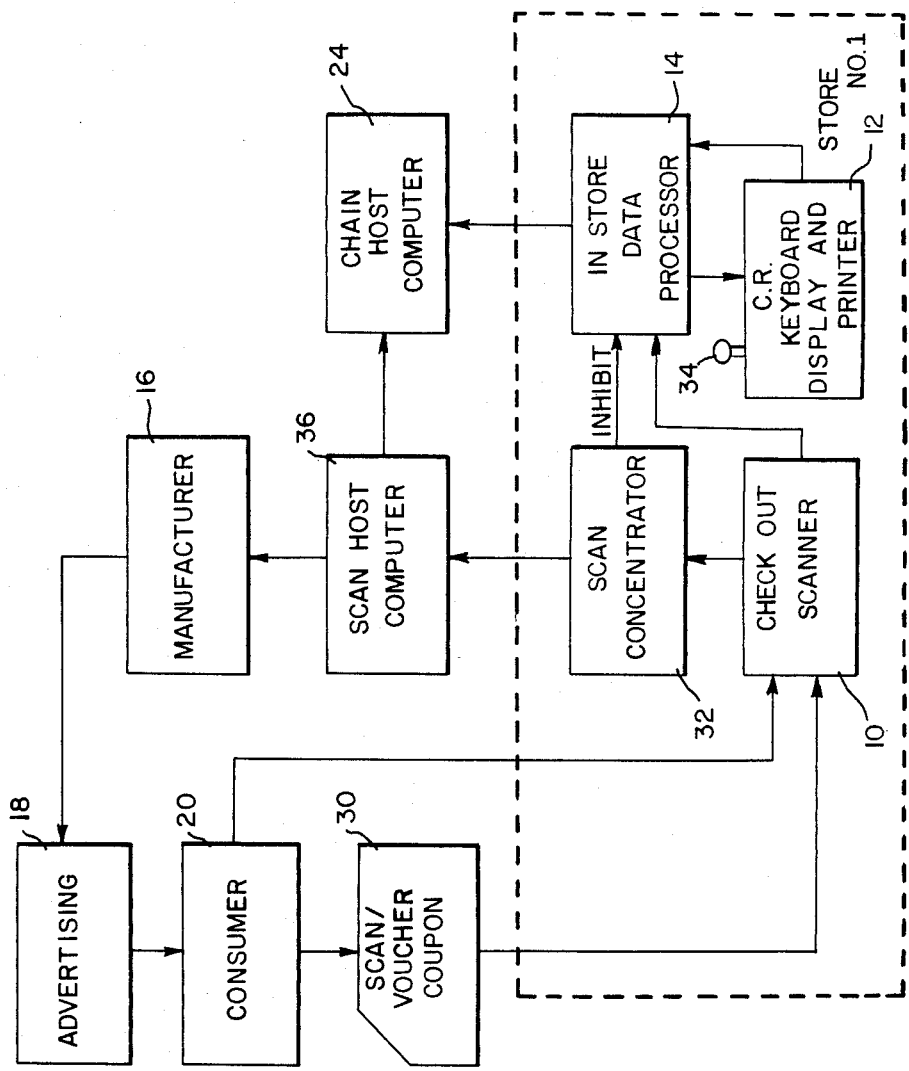
FIG. 2 is a block diagram illustrating a coupon redemption system according to the teachings of this invention.

Referring now to FIG. 2, there is shown a block diagram for handling coded redemption coupons according to the teachings of the present invention. In connection with the description of FIG. 2, similar items contain the same numbers as previously described in connection with FIG. 1.

The basic concept of the system described in FIG. 2 is to utilize all of the present equipment now available at each of the supermarkets equipped with code reading machine scanning equipment and to provide ancillary equipment for processing the coded redemption coupons so as not to interfere or change any of the present information processing equipment presently being used by each of the supermarkets.

Figure 3:
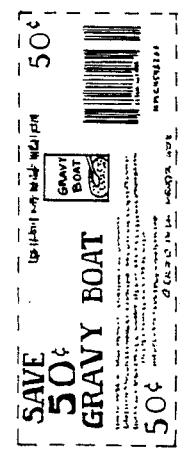
FIG. 3 illustrates a typical redemption coupon having machine readable codes.

The scan coupon 30 used in the present invention contains a machine readable code capable of being read at the point of sale terminal by the machine readable checkout scanner 10 located at each point of sale terminal in the supermarket store. The scan coupon 30 can have any shape or size and is limited only by having a machine readable code, a sample of which is shown in FIG. 3, which shows the UPC code on the redemption coupon 30. The coupon 30 also contains in man readable form all conditions which are encoded such as the fact it is a coupon, the manufacturer, the expiration date, and any other conditions that the manufacturer seeks to encode as a condition of redeeming the coupon.

From the consumer's point of view the operation is not changed in that the consumer 20 brings all items to the checkout scanner 10 where each sales voucher is scanned with the information being fed into the in-store data processor 14 and also to a scan concentrator 32. The scan concentrator holds all information received from the checkout scanner 10 in a suitable transaction register. The consumer 20 then submits the scan coupons 30 to the checkout clerk who in a similar manner feeds all coupons past the checkout scanner 10. The individual scan coupons 30 are suitably coded to identify the coupon as a coupon, which information is fed to the scan coupon concentrator 14 which is programmed to give credit for valid coupon redemptions and the information from the coded redemption coupon is compared with ticket information being held in the transaction register. The scan coupon concentrator upon verifying the conditions contained in the coded redemption coupon which is to find a product in the transaction register comparing to the coded information contained on the redemption coupon approves the credit and accumulates all redemption coupon information fed to the scan coupon concentrator. It transmits item information and credit information to the in-store data processor.

In the event that the scan coupon concentrator 32 does not find coincidence between the scan coupon redemption information and information held in the associated transaction register, the scan coupon concentrator generates an inhibit pulse which is fed to the in-store data processor 14 which transmits this information to the cash register which generates an audible signal to inform the clerk and customer that the document is invalid in this transaction because the terms and conditions encoded on the redemption coupon are not complied with.

Upon termination of the individual sale the in-store data processor 14 impulses the cash register, keyboard, display and printer 12 with the transaction total, giving credit for those coupons that have been verified and charging the customer for all items purchased as determined by the checkout scanner 10 and keyed input.

The scan coupon concentrator 32 accumulates all scan coupon information that has been approved and verified, which information is periodically transmitted by telephone lines to a remotely located scan host computer 36 that is adapted to receive similar information from all remotely located supermarkets. The accumulated information which can be sorted by manufacturer, product and cost, is then submitted to the manufacturer 16 for billing purposes together with the associated records that can be checked and verified. In a similar fashion the scan host computer 36 also feeds all accumulated data concerning verified coupons to the chain host computer 24 for normal bookkeeping operations which can be used to reconcile with the total records received from each in-store data processor 14, thereby allowing the chain host computer 24 to have a complete record of all sales of items and credits given for coupons from each supermarket store associated with the chain.

The present system now allows the manufacturer 16 to obtain a complete listing of all coupons redeemed from each supermarket and in a form that can be verified and in which there is less chance of error than in the manual scheme as illustrated in connection with FIG. 1. In addition, the chain host computer 24 now has a complete listing of accumulated sales for all items sold and for all coupons redeemed, thereby providing a more efficient system for billing the manufacturer for expenses incurred and for monies paid out by way of redemptions. The completely automated system reduces the chance for fraud and improves the turnaround time for billing by the chain host computer and allows the manufacturer to get more prompt and up to date information as to the use of his individual coupons.

Figure 4:
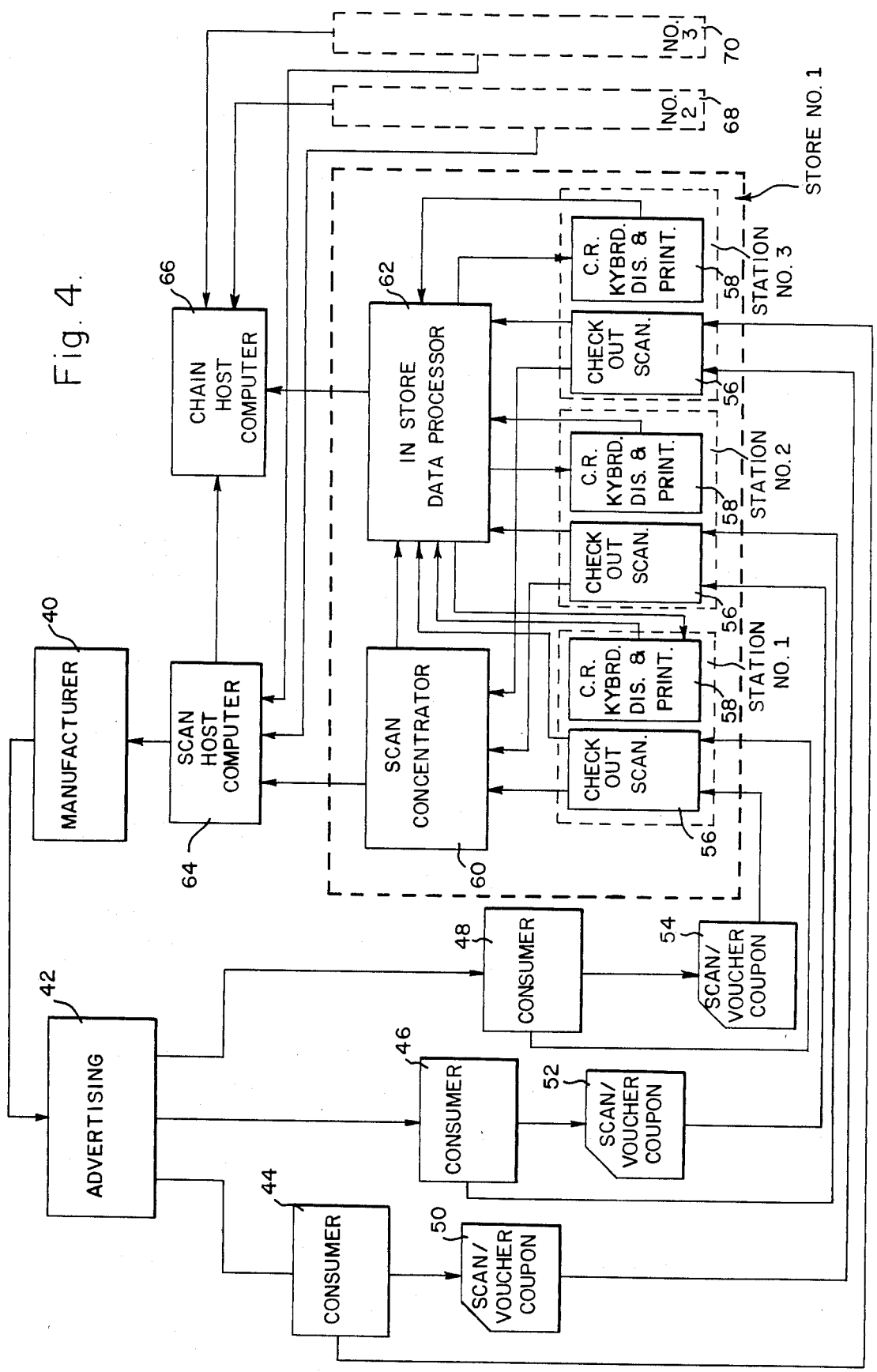
FIG. 4 is a block diagram of a coupon redemption system for a supermarket having a plurality of stores.

Referring now to FIG. 4, there is shown a block diagram of a complete coupon redemption system for use by a supermarket having at least three separate stores and at least three point of sale stations in each store. The manufacturer 40 in cooperation with advertising 42, generates a suitable interest in consumers 44, 46 and 48 to obtain scan coupons 50, 52 and 54, respectively, which coupons are of the type illustrated in connection with FIG. 3 and contain machine readable coded information.

The individual consumers make their purchases in a supermarket then present these purchases at any of the available point of sale terminals identified as stations 1, 2 and 3.

Each of the stations are identical and contain a checkout scanner 56 and a cash register, keyboard, display and printer 58. All point of sale stations are identical in operation in that each checkout scanner 56 feeds a scan coupon concentrator 60 and each cash register keyboard and printer is controlled by an in-store data processor 62. The output of the scan concentrator feeds a remotely located scan host computer 64 via a telephone line connection on a periodic demand basis. Similarly, the in-store data processor 62 feeds a remotely located chain host computer 66 via telephone lines and on a demand basis.

In a similar fashion other supermarket stores such as store number 2 identified as 68 and store number 3 identified as 70 also feed the chain host computer 66 and the chain host computer 64 and in a similar fashion.

It will be apparent to those skilled in the art that utilizing the system and method of the present invention does not interfere at all with the conventional manner in which a supermarket accounts for its sales and reports to its chain host computer. The ability of the system to automatically process coded redemption coupons does not preclude the system from also utilizing coupons that are not coded, which of course will be processed in the prior art manner as described in connection with FIG. 1. In other words, the system as described in FIGS. 3, 4 and 5 is strictly compatible with the prior art techniques as practiced today.

The food markets of yesteryear have become the supermarkets of today because of an increasing need to increase volume and offer the public goods far in excess of the conventional food market. As a result the supermarket now offers the consumer a wide variety of goods including liquor, foodstuff, clothing, utensils, tools, pots and pans, and most anything else that can be conveniently carried and displayed on the shelves. It is a generally well known and accepted principle that the greater number of people passing through a store will generate a greater volume of sales, and it is this principle that has prompted the supermarket of today to offer the greatest variety of goods possible in order to attract a greater volume of people.

The concept of utilizing a coded redemption coupon is actually a technique used by both the manufacturer of the goods and the supermarket to increase traffic through the store and make it as easy as possible for the customer to purchase the goods and at a discount to thereby increase store traffic and hopefully store volume of business.

Another technique used by the manufacturer is the concept that is sometimes defined as the self-liquidating premium in which the manufacturer includes a coupon in with his product or on the outside cover of his product that allows the consumer after purchasing the product to submit the coupon together with a fee for the purchase of a premium at some reduced rate. The term self-liquidating premium resides in the fact that the manufacturer usually supplies the premium at a price to the consumer that barely pays for the premium and the handling cost, and hence the term self-liquidating premium.

In order for the customer to take advantage of the premium, she must first purchase the product and then remove the coupon from the box and return it to the manufacturer together with the fee. Unfortunately, in order to entice the customer to purchase the premium there must be some element of advertising on the box in order to inform the customer of the features of the self-liquidating premium being offered. Usually the manufacturer will print a complete new box having the advertising on the outside and use the premium box for a given period of time in a given location as a promotional stunt to sell his product. The alternative method is to simply place the coupon inside the box which is then discovered by the consumer after the product has been purchased and used. The obvious disadvantages of enticing the consumer to purchase the product to obtain a premium that she doesn't know about is obvious.

The system and method to be described in connection with FIG. 5 utilizes an embodiment of the coded redemption coupon principle in preparing a coded sales voucher in the form of a sales ticket which is available to the customer and which the customer may use at the supermarket to order the premium while at the same time purchasing the goods in question. This allows the consumer to satisfy the terms of the self-liquidating premium in purchasing the goods in question and at the same time order the premium without any further necessity of filling out a coupon or writing a check but, rather, the customer pays the complete bill for the goods and the premium at the point of sale terminal in the supermarket.

Referring now to FIG. 5, there is shown a block diagram of another embodiment of the method and system which provides the customer with a coded sales voucher in the form of a coded redemption coupon or a coded sales ticket for use by the customer in purchasing a premium that is not stocked or carried in the supermarket.

A manufacturer 80 makes a determination to offer coded redemption coupons to the general public and also to offer a self-liquidating premium at a reduced cost provided the customer satisfies certain conditions in purchasing a given product. The manufacturer 80 works closely with his advertising 82 to advertise this fact to the consumer 84. At the same time the manufacturer 80 works very closely with the scan host computer 86 associated with the supermarket chain in the area where the manufacturer intends to promote the special offer.

In the preferred embodiment of the system described in connection with FIG. 5, each supermarket contains a scan printer keyboard and display 88 that is capable of generating a coded sales voucher either in the form of a coded redemption coupon or in the form of a coded sales ticket depending upon the input supplied by the customer. The display shown by the scan printer keyboard and display 88 is under the direct control of a scan coupon concentrator 90 that is periodically updated and programmed by the scan host computer 86. In this fashion the scan printer keyboard and display 88 can be made to display currently available coded redemption coupons or coded sales tickets in the form of premiums or products or product services that are being offered by the individual manufacturers. In one embodiment an ID card 92 previously issued to the consumer can be used to input the scan printer keyboard and display 88 to thereby facilitate the identification of the buyer during the printing of the sales voucher document 94. The customer may either select a scan coupon 96 that will have coded redemption information imprinted on the coupon or the customer may select a sales voucher document 94 that will be imprinted and will contain coded sales ticket information concerning the self-liquidating premium selected by the consumer.

The sales voucher document 94 generated by the scan printer keyboard and display 88 contains a machine readable coded number identifying the customer's name and address, the premium selected, the manufacturer's name, and any other information necessary to automatically process the document. In the same fashion, the scan printer keyboard and display 88 will generate a scan redemption coupon 96 having coded information regarding terms of the sale as previously mentioned and in machine readable form.

The customer makes her purchases at the supermarket in the same fashion as before and presents all items together with the sales voucher document and the scan redemption coupon to the point of sale terminal where the checkout clerk subjects all tickets to a checkout scanner 98. The checkout procedure and verification procedure is the same as previously mentioned in that the output of the checkout scanner feeds the scan coupon concentrator 90 which holds all item sale information in a transaction register and then compares the coded scan redemption coupon information to determine compliance with the terms of the coupon. Another output of the checkout scanner 98 feeds an in-store data processor 100 which in turn controls the cash register, keyboard, display and printer 102 as previously described. If all terms and conditions of the scan redemption coupon 96 are met, then the in-store data processor 100 transmits full credit for the coupon and that information is communicated to the cash register, keyboard, display and printer 102, and the sale continues in a normal fashion. However, should the scan redemption coupon 96 presented by the customer have encoded conditions that were not satisfied by the customer, then the scan coupon concentrator 90 will generate an inhibit signal to the in-store data processor which will stop credit or sale and also give a visual indication by an audible sound, such sound indicating to the clerk and the consumer that credit for that particular scan redemption coupon will not be honored because of failure of the conditions listed on the coupon.

The checkout scanner also scans the encoded information on the sales voucher document 94 which transmits this information to the scan coupon concentrator 90 located in each store. This information is accumulated and on a periodic basis is transmitted to the scan host computer 86 and ultimately to the manufacturer 80. Typically this information is transmitted after the day's business and is transmitted on a periodic basis at least once a day. The manufacturer 80 usually gets this information regarding the sale of the self-liquidating premium as evidenced by the sales voucher document 94 within 24 hours and immediately communicates with the product fulfillment center 106 with instructions to make shipment of the premium directly to the consumer 84.

In the system described, the customer pays for the self-liquidating premium as evidenced by the sales voucher document 94 at the same time that payment is made for all other items purchased at the supermarket and the manufacturer is not notified of the sale unless the sale has been completed and payment received. In this fashion the order can be submitted immediately and the turnaround between ordering of the premium at the store and delivery by the product fulfillment center 106 can take place usually within 48 hours.

It will also be appreciated by those skilled in the art that information between the manufacturer and the store regarding the offering of coded redemption coupons and self-liquidating premiums can be handled on an immediate basis and with a minimum of delay time since the manufacturer 80 is in direct contact with the scan host computer 86 which controls the scan coupon concentrator 90 in each of the stores. The programming of the scan printer keyboard and display 88 in each store can be handled directly and automatically by means of the scan coupon concentrator 90 located in each store.

Verification of any issued sales voucher document 94 or scan redemption coupon 96 in the scan coupon concentrator 90 can be done quickly and easily since only valid documents will be honored and validity can be determined immediately since the scan coupon concentrator programs the scan printer keyboard and display 88 to issue the documents and coupons in question.

The manufacturer 80 can therefore control the number of coupons being offered to the public and the number of sale voucher documents can also be controlled if there is a limit on the number of premiums being offered. For example, if the manufacturer has a given number of premiums located in the product fulfillment center 106, then the scan host computer 86 will so inform the scan coupon concentrator 90 to limit the number of sale voucher documents 94 issued by the scan printer keyboard and display 88 to the same given number, thereby insuring that all sale voucher documents will be honored. The system also handles lost or destroyed documents or coupons since unredeemed sales voucher documents 94 are not entered into the system until redeemed by the customer and paid for by the customer. In this fashion inventory control is precise and is updated every 24 hours to account for lost or destroyed documents or coupons.

The scan host computer 86 can therefore program each in-store scan printer keyboard and display with coupons or sale voucher documents from any given number of manufacturers limited only by the capacity of the scan printer 88.

The system described in connection with FIG. 5 is also flexible and will incorporate the use of sale voucher documents 94 and scan redemption coupons 96 that are obtained by the customer 84 and from a variety of different sources rather than from the scan printer 88 located within the store. In other words, the manufacturer may advertise in the local paper or use throwaway papers which include redemption coupons. The customer may use these documents or coupons and use them at the store when paying her bill. The machine readable codes on the sale voucher documents and the scan redemption coupon will indicate the source of the document and hence the process will handle these documents in the same manner as described in connection with FIGS. 2 and 4, as modified by the system illustrated in connection with FIG. 5.

In practice, a single host computer can service approximately 500 supermarkets with a link to each store by means of dial-up telephone lines. It is important to note that in all of the embodiments described the verification of the encoded coupons or sale voucher documents is handled in parallel with the store's present system for handling the scanning and sale of items at the point of sale terminal. The scan concept of verification is done in parallel and hence the service given the store and the customer is in addition to the normal services available to the customer by means of machine readable scanning equipment.

We claim:

1. An inventory control system for use in a supermarket comprising:

a sales voucher printer located at each store for printing coded sale vouchers having machine readable codes, a plurality of point of sale terminals each consisting of a cash register, keyboard, display and printer, and code reading machine scanning equipment capable of reading said coded sale vouchers, a single scan coupon concentrator at each store communicating with each code reading machine scanning equipment and in real time for continuously comparing coded sale voucher information at each sale terminal and for each sale transaction to determine compliance of all coded voucher conditions, an in-store data processor controlling said cash register, keyboard, display and printer, and communicating with each code reading machine scanning equipment for continuously identifying, accumulating and processing all sales information from each point of sale terminal, said scan coupon concentrator processing and accumulating all coupon redemption information and sale voucher information for every complete transaction at each point of sale terminal to determine compliance with coded conditions, transmitting coupon information, voucher information and, in the absence of compliance, an inhibit signal to said in-store data processor for crediting customer, collecting money, or indicating non-compliance, a scan host computer located remotely from said supermarket periodically communicating with each scan coupon concentrator in each store to receive accumulated sales voucher information for transmission to the manufacturer for processing, and a chain host computer located remotely from said supermarket periodically communicating with each in-store data processor to receive accumulated total sales information including voucher sales information for that store and in which said scan host computer feeds accumulated voucher sales information received from all stores to said chain host computer thereby providing the central chain host computer with complete information as to voucher sales for reconciliation with information from all stores.

2. An inventory control system for use in a supermarket according to claim 1 in which said sales voucher printer prints coded redemption coupons having machine readable codes at the selection of the customer and in which all code reading machine scanning equipment at all point of sale terminals are capable of reading all coded documents generated by said sales voucher printer.

3. An inventory control system for use in a supermarket according to claim 1 in which each scan coupon concentrator located at each store continuously updates and controls the coded documents printed by said scan printer in response to information received by said single scan host computer.

4. An inventory control system for use in a supermarket comprising:

a sales voucher printer located at each store for printing coded sale vouchers having machine readable codes and coded redemption coupons having machine readable codes, a plurality of point of sale terminals each consisting of a cash register, keyboard, display and printer, and code reading machine scanning equipment capable of reading said coded redemption coupons and said coded sales vouchers, a single scan coupon concentrator at each store communicating with each code reading machine scanning equipment and in real time for continuously comparing coded sale voucher information and coded redemption coupon information at each terminal and for each sale transaction to determine compliance of all coded conditions, an in-store data processor controlling said cash register, keyboard, display and printer, and communicating with each code reading machine scanning equipment for continuously identifying, accumulating and processing all sales information, said scan coupon concentrator processing and accumulating all coupon redemption information and sale voucher information for every complete transaction at each point of sale terminal to determine compliance with coded conditions and, in the absence of compliance, an inhibit signal to said in-store data processor for crediting customer, collecting money, or indicating non-compliance.

a scan host computer located remotely from said supermarket periodically communicating with each scan coupon concentrator in each store to receive accumulated coupon redemption information and accumulated sales voucher information for transmission to the manufacturer for processing, and a chain host computer located remotely from said supermarket periodically communicating with each in-store data processor to receive total accumulated sales information including voucher sales information and coupon redemption information from all stores to said chain host computer thereby providing the central chain host computer with complete information as to voucher sales and coupon redemption sales for all stores.

5. An inventory control system for use in a supermarket comprising:

a plurality of point of sale terminals each consisting of a cash register, keyboard, display and printer, and a code reading machine scanning equipment capable of reading coded redemption coupons, an in-store data processor controlling said cash register, keyboard, display and printer, and communicating with each code reading machine scanning equipment for continously identifying, accumulating and processing all coded redemption information from each point of sale terminal, and a single scan coupon concentrator at each store communicating with each code reading machine scanning equipment in real time for continuously comparing coupon redemption information with sales information at each sale terminal and for each sale transaction to determine compliance of all coded coupon redemption conditions, said scan coupon concentrator processing and accumulating all coupon redemption information and sale voucher information for every complete transaction at each point of sale terminal to determine compliance with coded conditions, transmitting coupon information, voucher information, and in the absence of compliance, an inhibit signal to said in-store data processor for crediting customer, collecting money, or indicating non-compliance, and a coupon printer located at each store and adapted to be controlled by a customer for printing a variety of selected coupons each having machine readable coded information, said scan coupon concentrator controls said coupon printer thereby allowing management control over the coded redemption coupons issued by said printer.

6. An inventory control system according to claim 5 in which a scan host computer located remotely from said supermarket periodically communicates with each scan coupon concentrator in each store to receive accumulated coupon redemption information for transmission to the manufacturer for payment.

7. An inventory control system according to claim 6 in which a chain host computer located remotely from said supermarket periodically communicates with each in-store data processor to receive total accumulated sale item information for that store and in which said scan host computer feeds total accumulated coupon redemption information received from all stores to said chain host computer thereby providing the central chain host computer with complete reconciliation information as to coupon redemption information for all stores.

8. inventory control system according to claim 5 in which said coupon printer under control of a customer prints and issues a coded sales voucher document having machine readable coded information regarding the sale of items and services and premiums not carried at the supermarket.

9. An inventory control method for use in a supermarket comprising the steps of:
   providing a sales voucher printer located at each store for printing coded sale vouchers having machine readable codes,
   providing a plurality of point of sale terminals each consisting of a cash register, keyboard, display and printer, and machine readable scanning equipment capable of reading the coded sale vouchers,
   utilizing a single scan coupon concentrator at each store communicating with each code reading machine scanning equipment and in real time for continuously comparing coded sale voucher information at each sale terminal and for each sale transaction to determine compliance of all coded voucher conditions,
   utilizing an in-store data processor controlling said cash register, keyboard, display and printer, and communicating with each code reading machine scanning equipment for continuously identifying, accumulating and processing all sales information including coded sale voucher information from each point of sale terminal,
   processing and accumulating all coupon redemption information in the scan coupon concentrator for every complete transaction at each point of sale terminal to determine compliance with coded conditions to transmit item information and credit to be given customer to said in-store data processor and in the absence of compliance generating an inhibit signal to said in-store data processor to inform clerk and customer that document is not valid,
   utilizing a scan host computer located remotely from said supermarket periodically communicating with each scan coupon concentrator in each store to receive accumulated sales voucher information for transmission to the manufacturer for processing, and
   utilizing a chain host computer located remotely from said supermarket periodically communicating with each in-store data processor to receive total accumulated sale information including total voucher sale information for that store and in which the scan host computer feeds accumulated sales voucher information received from all stores to the chain host computer thereby providing the central chain host computer with complete reconciliation information as to sales voucher information for all stores.

10. An inventory control method according to claim 8 in which the sale voucher printer located at each store is capable of printing coded redemption coupons having machine readable codes and at the selection of a customer.

11. An inventory control method, for use in a supermarket according to claim 9 in which each scan coupon concentrator in each store controls the scan printer at that store in issuing coded redemption coupons and coded sales vouchers, and in which management through the single scan host computer controls each scan coupon concentrator located in each store thereby providing direct access through the sales voucher printer to supply a customer with updated coded redemption coupons and coded sales voucher documents.

12. An inventory control method for use in a supermarket comprising the steps of:
   providing a plurality of point of sale terminals each consisting of a cash register, keyboard, display and printer and machine readable scanning equipment capable of reading coded redemption coupons,
   utilizing an in-store data processor controlling said cash register, keyboard, display and printer and communicating with each code reading machine scanning equipment for continuously identifying, acumulating and processing all coded redemption coupon information from each point of sale terminal, and
   utilizing a single scan coupon concentrator at each store communicating with each code reading machine scanning equipment in real time for continuously comparing coupon redemption information with total sales information at each sale terminal and for each sale transaction to determine compliance of all coded coupon redemption conditions,
   processing and accumulating all coupon redemption information in the scan coupon concentrator for every complete transaction at each point of sale terminal to determine compliance of all coded coupon redemption conditions to transmit item information and credit to be given to customer to said in-store data processor and in the absence of compliance geneating an inhibit signal to said in-store data processor to inform clerk and customer that the document is not valid, and
   a coupon printer located at each store and adapted to be controlled by a consumer for printing a variety of selected coupons each having machine readable coded information.

13. An inventory control method according to claim 11 which includes the step of utilizing a scan host computer located remotely from said supermarket to periodically communicate with each scan coupon concentrator in each store to receive atcumulated coupon redemption information for transmission to the manufacturer for payment.

14. An inventory control system according to claim 12 which utilizes a chain host computer located remotely from the supermarket for periodically communicating with each in-store data processor to receive total accumulated sale item information for that store and in which the scan host computer feeds total accumulated coupon redemption information received from all stores to the chain host computer thereby providing the central chain host computer with complete reconciliation information as to sales information and coupon redemption information for all stores.

15. An inventory control method according to claim 12 which utilizes the individual scan control concentrator to control the coupon printer thereby allowing management to control issuance of coded redemption coupons capable of being issued by the printer.

* * * * *